(No Model.)
G. L. OGLE.
TIRE FOR VEHICLE WHEELS.
No. 600,208. Patented Mar. 8, 1898.
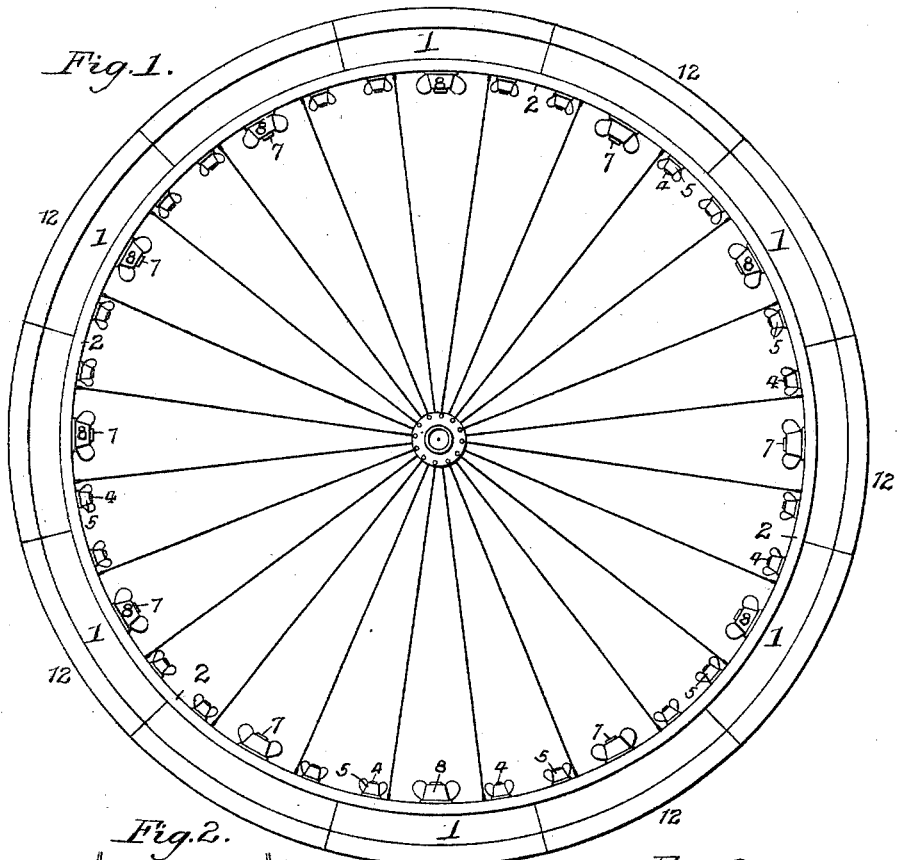
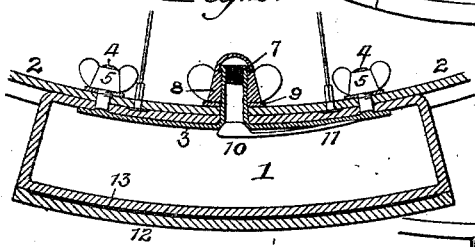
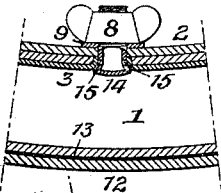
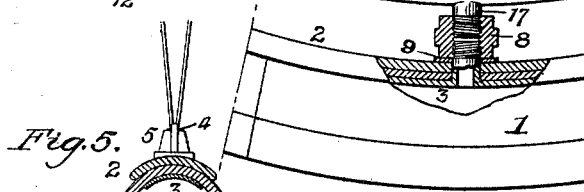
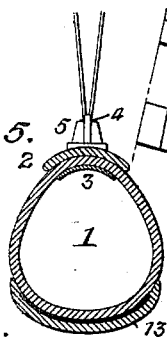
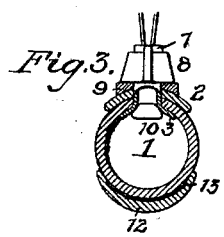
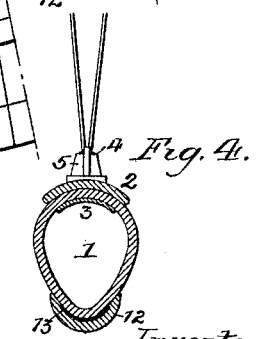
Witnesses:
Clifford R. Harris
F. E. Bechtold
Inventor:
Graham L. Ogle
by his Attorneys,
Howson & Howson

United States Patent Office.

GRAHAM L. OGLE, OF WILMINGTON, DELAWARE.

TIRE FOR VEHICLE-WHEELS.

SPECIFICATION forming part of Letters Patent No. 600,208, dated March 8, 1898.

Application filed March 22, 1897. Serial No. 628,729. (No model.)

*To all whom it may concern:*

Be it known that I, GRAHAM L. OGLE, a citizen of the United States, and a resident of Wilmington, Delaware, have invented certain Improvements in Tires for Vehicle-Wheels, of which the following is a specification.

The object of my invention is to so construct a pneumatic tire for the wheels of vehicles as to guard against puncture of the same and so that puncture or other accidental injury to any part of the tire will disable only a limited section of the tire, leaving the remainder of the tire in condition to perform its intended functions. This object I attain in the manner hereinafter set forth, reference being had to the accompanying drawings, in which—

Figure 1 is a view of a wheel for vehicles constructed in accordance with my invention. Fig. 2 is a view, on a larger scale, of part of the wheel, showing one of the sections of the tire of the same. Fig. 3 is a transverse section of the wheel-rim and tire. Figs. 4, 5, and 6 are views illustrating modifications of the invention, and Fig. 7 is a sectional view illustrating a feature of the invention not shown in the other figures.

The wheel so far as regards the hub, spokes, and rim or felly of the same may be constructed of wood or metal and in any manner which may be desired, this portion of the wheel forming no particular part of my invention, the latter being limited to the peculiar construction of the tire, which I will now proceed to describe.

Said tire consists of a number of disconnected tubular sections 1, closed at the ends and of a length which may vary in accordance with the number of sections desired for the entire rim, each of these sections being clamped to the rim 2 of the wheel by means of an internal plate 3 of a contour corresponding with that of the rim, said internal plate 3 having at each end a threaded stem 4, which passes through an opening in the tire-section 1 and through an opening in the rim, that portion of the threaded stem which projects inwardly from the rim receiving a nut 5, which bears upon a washer 6, seated on the inner face of the rim, as shown in Figs. 3 and 4. The internal plate 3 also has a central tubular stem 7, projecting through openings in the tire-section and rim and externally threaded for the reception of a nut 8, which bears upon a washer 9, seated on the inner face of the rim, as shown in Figs. 1, 2, and 3, the inner end of said tubular stem being closed by a valve 10, which is mounted upon a spring-arm 11, secured to the plate 3 in any desirable manner, the tendency of said spring being to hold the valve closely to its seat at the inner end of the tubular stem 7, so as to form an airtight joint therewith. The outer end of the tubular stem 7 is threaded internally for the reception of a pump or pump attachment, whereby air under pressure may be forced into the tire-section 1 and retained therein by the valve 10.

When it is desired to fill all of the sections of the tire simultaneously, I provide a common filling-tube extending around the wheel and having nipples secured to the ends of the stems 7, said tube being also provided with a valved nipple through which air under pressure may be forced into the same and thence into each of the tire-sections 1. In Fig. 7 I have illustrated part of such a filling-tube 16, and in order to connect the nipple 17 of the same to the tube 7 I utilize the same nut $8^a$ which secures said stem to the rim of the wheel, said nut being reversely threaded at its opposite ends, one threaded portion receiving the stem 7 and the other receiving the nipple 17.

Each tire-section has on its outer portion a sole-plate 12, of rubber or equivalent material, to provide a heavy wearing-surface, and between said sole-plate and outer portion of the tire-section 1 is interposed a plate 13, of thin sheet metal or other material capable of resisting puncture, thereby guarding against this common accident to ordinary pneumatic tires. Should, however, any section of the tire be injured from any cause, so as to be unserviceable, it can be readily removed from the rim by unscrewing the nuts 5 and 8 and replaced by a good section, each section of the tire being so small that a number of them can be readily carried by the rider of the bicycle or other vehicle having wheels provided with my improved tires.

The shape of the tire-sections transversely may be varied as desired without departing from the essential features of my invention. Thus, as shown in Fig. 4, the tire tapers to a narrow tread, while the tire shown in Fig. 5 widens to a broad tread, the constructive features, however, being the same as in the tire shown in Figs. 2 and 3.

A single sole-plate extending around the tire may be used in place of the sectional sole-plates in either form of tire, if desired.

In Fig. 6 I have shown a modification of my invention which may be used whenever it is desired to draw positively against its seat the valve which serves to retain air under pressure in the tire-section. In this case the central tubular stem of the plate 3 is short and the valve 14 has a hollow stem externally threaded for the reception of the nut 8 and internally threaded for receiving the pump or pump attachment, whereby air is forced into the tire-section. The hollow stem has some distance above its inner end openings 15, which when the valve is drawn to its seat in the short central tube of the plate 3 are so tightly closed by the latter as to prevent the escape of air through them from the internal chamber of the tire-section. When it is desired to force air into the tire, however, the nut 8 may be loosened and the valve moved inward, so as to free these openings 15, and air can then be pumped through the hollow valve-stem and through said openings into the hollow tire-section.

While I prefer to use the confining-plate having a plurality of stems, one of which is tubular for the admission of air, the central tubular stem alone may be relied upon for securing the confining-plate in position, if desired.

Having thus described my invention, I claim and desire to secure by Letters Patent—

1. A wheel having hollow disconnected tire-sections with internal plates between which and the rim of the wheel said tire-sections are confined, said plates having integral hollow stems passing through the rim of the wheel and engaged by nuts whereby they are confined to said rim, the ends of said stems being closed by spring-mounted valves, whereby they serve both as a means of securing the internal confining-plate to the rim and of introducing air into and maintaining it in the tire-sections, substantially as described.

2. A wheel having hollow disconnected tire-sections with internal plates between which and the rim of the wheel said tire-sections are confined, said plates having near each end bolts projecting through the rim and having confining-nuts on the inner side of the latter, the plates also having intermediate of the end bolts integral hollow stems passing through the rim of the wheel and engaged by nuts whereby they are confined to said rim, the inner ends of said stems being closed by spring-mounted valves, whereby they serve both as a means of securing the internal confining-plate to the rim and of introducing air into and maintaining it in the tire-sections, substantially as described.

In testimony whereof I have signed my name to this specification in the presence of two subscribing witnesses.

GRAHAM L. OGLE.

Witnesses:
F. E. BECHTOLD,
JOS. H. KLEIN.